US012620342B2

(12) United States Patent
Han et al.

(10) Patent No.: US 12,620,342 B2
(45) Date of Patent: May 5, 2026

(54) DISPLAY APPARATUS FOR REDUCING AN EFFECT OF CROSS-TALK AND METHOD FOR CONTROLLING SAME

(71) Applicant: SAMSUNG ELECTRONICS CO., LTD., Suwon-si (KR)

(72) Inventors: Seungryong Han, Suwon-si (KR); Tetsuya Shigeta, Suwon-si (KR); Gangmo Koo, Suwon-si (KR); Hwaseok Seong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/625,813

(22) Filed: Apr. 3, 2024

(65) Prior Publication Data

US 2024/0274066 A1 Aug. 15, 2024

Related U.S. Application Data

(63) Continuation of application No. PCT/KR2022/016464, filed on Oct. 26, 2022.

(30) Foreign Application Priority Data

Dec. 20, 2021 (KR) ........................ 10-2021-0182813

(51) Int. Cl.
*G09G 3/32* (2016.01)

(52) U.S. Cl.
CPC ....... *G09G 3/32* (2013.01); *G09G 2300/0452* (2013.01); *G09G 2320/0209* (2013.01); *G09G 2320/0276* (2013.01)

(58) Field of Classification Search
None
See application file for complete search history.

(56) References Cited

U.S. PATENT DOCUMENTS 7,773,049 B2 8/2010 Ueno et al.
8,648,886 B2 2/2014 Baek
(Continued)

FOREIGN PATENT DOCUMENTS

JP 3792246 B2 7/2006
JP 2013-115520 A 6/2013
(Continued)

OTHER PUBLICATIONS

Espacenet English Translation of KR100856161B1 Crosstalk Elimination Circuit, Liquid Crystal Display Apparatus, and Display Control Method Sep. 3, 2008 (Year: 2008).*
(Continued)

*Primary Examiner* — Donna V Bocar
(74) *Attorney, Agent, or Firm* — Sughrue Mion, PLLC

(57) ABSTRACT

A display apparatus includes a display including a plurality of pixels; a memory storing a cross-talk weight for each gradation of adjacent pixels corresponding to a gradation value of a target pixel; and at least one processor configured to: obtain a gradation value of each pixel included in at least one line of pixels among the plurality of pixels, obtain histogram information indicating a number of pixels corresponding to each gradation section based on the obtained gradation value of each pixel in the at least one line of pixels, identify an amount of cross-talk corresponding to a target pixel based on the histogram information and the cross-talk weight for each gradation of adjacent pixels corresponding to a gradation value of the target pixel, and obtain a gradation correction value of the target pixel based on the identified amount of cross-talk.

20 Claims, 12 Drawing Sheets

500 530 510 540 541 520

| | | P1 GRADATION (Source) | | | | | | |
|---|---|---|---|---|---|---|---|---|
| | | 0 | 17 | 34 | 51 | 102 | 153 | 204 |
| P2 GRADATION (Target) | 0 | 0 | 0 | 0 | 0 | 0 | 0 | 0 |
| | 17 | -1000 | 0 | +300 | +200 | +150 | +200 | +300 |
| | 34 | -600 | -300 | 0 | +150 | +100 | +100 | +200 |
| | 51 | -400 | -150 | -100 | 0 | +100 | +200 | +250 |
| | 102 | -150 | -50 | -30 | -100 | 0 | +100 | +150 |
| | 153 | -60 | -20 | 0 | 0 | 0 | 0 | +50 |
| | 204 | -40 | -20 | -200 | 0 | 0 | -150 | 0 |

(56) References Cited

U.S. PATENT DOCUMENTS

| | | | | |
|---|---|---|---|---|
| 10,993,431 | B2 | 5/2021 | Fujii et al. | |
| 11,004,400 | B2 | 5/2021 | Yoon et al. | |
| 11,189,218 | B2 | 11/2021 | Fujii et al. | |
| 2013/0135272 | A1 * | 5/2013 | Park | G09G 3/3233 345/211 |
| 2019/0080656 | A1 | 3/2019 | Herranz et al. | |

FOREIGN PATENT DOCUMENTS

| | | | | |
|---|---|---|---|---|
| JP | 2019-159223 | A | 9/2019 | |
| KR | 10-0205426 | B1 | 7/1999 | |
| KR | 10-0516048 | B1 | 12/2005 | |
| KR | 10-0856161 | B1 | 9/2008 | |
| KR | 10-2011-0013925 | A | 2/2011 | |
| KR | 10-2019-0061269 | A | 6/2019 | |
| KR | 10-2020-0133129 | A | 11/2020 | |
| KR | 10-2021-0057892 | A | 5/2021 | |
| KR | 10-2275491 | B1 | 7/2021 | |
| KR | 10-2021-0110432 | A | 9/2021 | |
| WO | WO-2022244073 | A1 * | 11/2022 | G09G 3/3233 |

OTHER PUBLICATIONS

International Search Report (PCT/ISA/210) issued on Feb. 14, 2023 by the International Searching Authority for International Patent Application No. PCT/KR2022/016464.

Written Opinion (PCT/ISA/237) issued on Feb. 14, 2023 by the International Searching Authority for International Patent Application No. PCT/KR2022/016464.

Communication dated Apr. 24, 2025, issued by the Korean Patent Office in Korean Application No. 10- 2021-0182813.

* cited by examiner

FIG. 3

300

310

320

| | | P1 GRADATION (Source) | | | | |
|---|---|---|---|---|---|---|
| | | 0 | 51 | 102 | 153 | 204 |
| P2 GRADATION (Target) | 0 | 0 | 0 | 0 | 0 | 0 |
| | 51 | -400 | 0 | +100 | +200 | +250 |
| | 102 | -150 | -100 | 0 | +100 | +150 |
| | 153 | -60 | 0 | 0 | 0 | +50 |
| | 204 | -40 | 0 | 0 | -150 | 0 |

FIG. 4A

410

411

412

| | | P1 R GRADATION (Source) | | | | |
|---|---|---|---|---|---|---|
| | | 0 | 51 | 102 | 153 | 204 |
| P2 R GRADATION (Target) | 0 | 0 | 0 | 0 | 0 | 0 |
| | 51 | -300 | 0 | +80 | +150 | +200 |
| | 102 | -100 | -70 | 0 | +60 | +90 |
| | 153 | -40 | 0 | 0 | 0 | +30 |
| | 204 | -30 | 0 | 0 | -80 | 0 |

FIG. 4B

420

421

422

| | | P1 G GRADATION (Source) | | | | |
|---|---|---|---|---|---|---|
| | | 0 | 51 | 102 | 153 | 204 |
| P2 G GRADATION (Target) | 0 | 0 | 0 | 0 | 0 | 0 |
| | 51 | -250 | 0 | +70 | +140 | +180 |
| | 102 | -90 | -50 | 0 | +70 | +100 |
| | 153 | -50 | 0 | 0 | 0 | +40 |
| | 204 | -20 | 0 | 0 | -110 | 0 |

FIG. 4C

430

431

432

| | | P1 B GRADATION (Source) | | | | |
|---|---|---|---|---|---|---|
| | | 0 | 51 | 102 | 153 | 204 |
| P2 B GRADATION (Target) | 0 | 0 | 0 | 0 | 0 | 0 |
| | 51 | -270 | 0 | +70 | +160 | +210 |
| | 102 | -130 | -60 | 0 | +80 | +110 |
| | 153 | -50 | 0 | 0 | 0 | +30 |
| | 204 | -20 | 0 | 0 | -90 | 0 |

FIG. 5

500

530 510

| | | P1 GRADATION (Source) | | | | | | |
|---|---|---|---|---|---|---|---|---|
| | | 0 | 17 | 34 | 51 | 102 | 153 | 204 |
| P2 GRADATION (Target) | 0 | 0 | 0 | 0 | 0 | 0 | 0 | 0 |
| | 17 | -1000 | 0 | +300 | +200 | +150 | +200 | +300 |
| | 34 | -600 | -300 | 0 | +150 | +100 | +100 | +200 |
| | 51 | -400 | -150 | -100 | 0 | +100 | +200 | +250 |
| | 102 | -150 | -50 | -30 | -100 | 0 | +100 | +150 |
| | 153 | -60 | -20 | 0 | 0 | 0 | 0 | +50 |
| | 204 | -40 | -20 | -200 | 0 | 0 | -150 | 0 |

540 541

520

DISPLAY APPARATUS FOR REDUCING AN EFFECT OF CROSS-TALK AND METHOD FOR CONTROLLING SAME

CROSS REFERENCE TO RELATED APPLICATION(S)

This application is a continuation of International Application No. PCT/KR2022/016464, filed on Oct. 26, 2022, in the Korean Intellectual Property Receiving Office, which is based on and claims priority to Korean Patent Application No. 10-2021-0182813, filed on Dec. 20, 2021, in the Korean Intellectual Property Office, the disclosures of which are incorporated by reference herein in their entireties.

BACKGROUND

1. Field

The disclosure relates to a display apparatus and a method for controlling the same, and more particularly, to a display apparatus equipped with a function of reducing cross-talk, and a method for controlling the same.

2. Description of Related Art

Recently, display apparatuses displaying images through a display panel are generally being distributed and used. A display apparatus may include a plurality of thin film transistors (TFTs) on a display panel, and electromagnetic coupling that was not intended may be generated in the designing process of the display apparatus among the plurality of TFTs.

In other words, due to electromagnetic coupling that was generated among the plurality of TFTs, influence is exerted among adjacent pixels on the display panel, and due to this, pixels operating in higher luminance or lower luminance than the luminance to be output by the display apparatus may be generated, and this is referred to as cross-talk (X-talk).

In case cross-talk is generated, degradation may be generated in an image provided through the display panel, and the satisfaction of a user who is provided with the image may be reduced. Accordingly, there has been a continuous demand for a method for reducing cross-talk generated in a display panel.

SUMMARY

One or more aspects will be set forth in part in the description which follows and, in part, will be apparent from the description, or may be learned by practice of the presented embodiments.

According to an aspect of an embodiment, a display apparatus may include a display including a plurality of pixels; a memory storing a cross-talk weight for each gradation of adjacent pixels corresponding to a gradation value of a target pixel; and at least one processor configured to: obtain a gradation value of each pixel included in at least one line of pixels among the plurality of pixels, obtain histogram information indicating a number of pixels corresponding to each gradation section based on the obtained gradation value of each pixel in the at least one line of pixels, identify an amount of cross-talk corresponding to a target pixel based on the histogram information and the cross-talk weight for each gradation of adjacent pixels corresponding to a gradation value of the target pixel, obtain a gradation correction value of the target pixel based on the identified amount of cross-talk, and obtain a corrected gradation value of the target pixel based on the obtained gradation correction value.

The cross-talk weight may include a cross-talk weight for each gradation of an adjacent pixel corresponding to a first gradation value of the target pixel and a cross-talk weight for each gradation of an adjacent pixel corresponding to a second gradation value of the target pixel.

The cross-talk weight for each gradation of the adjacent pixel corresponding to the first gradation value of the target pixel may include: based on the target pixel having the first gradation value, a cross-talk weight for each gradation according to a distance between the target pixel and the adjacent pixel, and the cross-talk weight for each gradation of the adjacent pixel corresponding to the second gradation value of the target pixel may include: based on the target pixel having the second gradation value, a cross-talk weight for each gradation according to the distance between the target pixel and the adjacent pixel.

The at least one processor may be further configured to divide a gradation range into a plurality of gradation sections, and identify a number of pixels corresponding to each of the plurality of gradation sections based on the obtained gradation value for each pixel to obtain the histogram information.

The at least one processor may be further configured to divide a first gradation range that is smaller than a threshold value in the gradation range into a plurality of gradation sections having a first length, and divide a second gradation range that is greater than or equal to the threshold value in the gradation range into a plurality of gradation sections having a second length that is longer than the first length to obtain the histogram information.

The cross-talk weight may include: a cross-talk weight for each gradation of at least one of an R sub-pixel, a G sub-pixel, or a B sub-pixel of an adjacent pixel corresponding to each gradation value of an R sub-pixel of the target pixel; a cross-talk weight for each gradation of at least one of the R sub-pixel, the G sub-pixel, or the B sub-pixel of the adjacent pixel corresponding to each gradation value of a G sub-pixel of the target pixel; and a cross-talk weight for each gradation of at least one of the R sub-pixel, the G sub-pixel, or the B sub-pixel of the adjacent pixel corresponding to each gradation value of a B sub-pixel of the target pixel.

The processor may be further configured to obtain a corrected gradation value of a first target pixel included in a first line of pixels among the plurality of pixels, based on a gradation value of each pixel included in the first line, and obtain a corrected gradation value of a second target pixel included in a second line of pixels among the plurality of pixels, based on a gradation value of each pixel included in the second line.

Each of the plurality of pixels may include at least one light emitting diode (LED).

According to an aspect of an embodiment, a method for controlling a display apparatus including a plurality of pixels, the method may include: obtaining a gradation value of each pixel included in at least one line of pixels among the plurality of pixels; obtaining histogram information indicating a number of pixels corresponding to each gradation section based on the obtained gradation value of each pixel in the at least one line of pixels; identifying an amount of cross-talk corresponding to a target pixel based on the histogram information and a cross-talk weight for each gradation of adjacent pixels corresponding to a gradation value of the target pixel; obtaining a gradation correction value of the target pixel based on the identified amount of cross-talk; and obtaining a corrected gradation value of the target pixel based on the obtained gradation correction value.

The cross-talk weight may include a cross-talk weight for each gradation of an adjacent pixel corresponding to a first gradation value of the target pixel and a cross-talk weight for each gradation of an adjacent pixel corresponding to a second gradation value of the target pixel.

The cross-talk weight for each gradation of the adjacent pixel corresponding to the first gradation value of the target pixel may include: based on the target pixel having the first gradation value, a cross-talk weight for each gradation according to a distance between the target pixel and the adjacent pixel, and the cross-talk weight for each gradation of the adjacent pixel corresponding to the second gradation value of the target pixel may include: based on the pixel having the second gradation value, a cross-talk weight for each gradation according to the distance between the target pixel and the adjacent pixel.

The obtaining the histogram information may include dividing a gradation range into a plurality of gradation sections, and identifying a number of pixels corresponding to each of the plurality of gradation sections based on the obtained gradation value for each pixel.

Dividing the gradation range into a plurality of sections may include dividing a first gradation range less than a threshold gradation into a plurality of gradation sections having a first length from the target pixel, and dividing a second gradation range that is greater than or equal to the threshold value in the gradation range into a plurality of gradation sections having a second length that is longer than the first length.

The cross-talk weight may include: a cross-talk weight for each gradation of at least one of an R sub-pixel, a G sub-pixel, or B sub-pixel of an adjacent pixel corresponding to each gradation value of an R sub-pixel of the target pixel; a cross-talk weight for each gradation of at least one of the R sub-pixel, the G sub-pixel, or the B sub-pixel of an adjacent pixel corresponding to each gradation value of a G sub-pixel of the target pixel; and a cross-talk weight for each gradation of at least one of the R sub-pixel, the G sub-pixel, or the B sub-pixel of an adjacent pixel corresponding to each gradation value of a B sub-pixel of the target pixel.

The method may further include: obtaining a corrected gradation value of a first target pixel included in a first line of pixels among the plurality of pixels, based on a gradation value of each pixel included in the first line; and obtaining a corrected gradation value of a second target pixel included in a second line of pixels among the plurality of pixels, based on a gradation value of each pixel included in the second line.

BRIEF DESCRIPTION OF DRAWINGS

The above and other aspects, features, and advantages of certain embodiments of the present disclosure will be more apparent from the following description taken in conjunction with the accompanying drawings, in which:

FIG. 3 is a diagram illustrating a cross-talk weight for each gradation of adjacent pixels according to an embodiment of the disclosure;

FIG. 4A, FIG. 4B, and FIG. 4C are diagrams illustrating cross-talk weights related to R, G, B sub-pixels according to an embodiment of the disclosure;

FIG. 5 is a diagram illustrating cross-talk weights regarding a plurality of gradation sections having different lengths from one another according to an embodiment of the disclosure;

DETAILED DESCRIPTION

Figure 1:
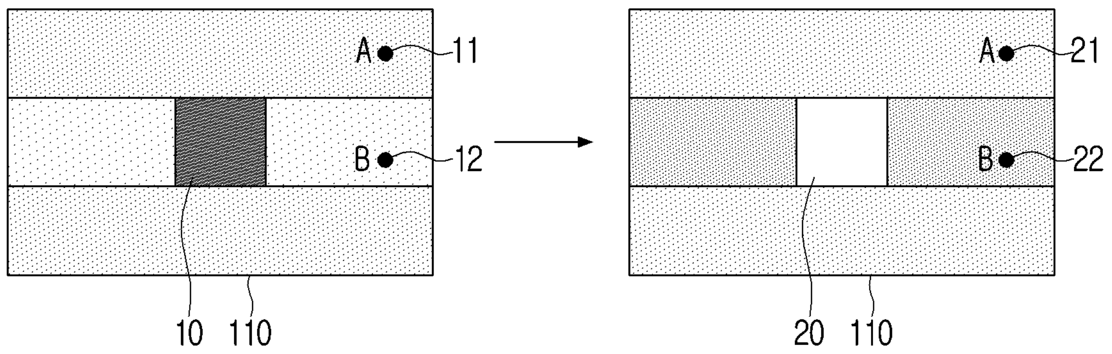
FIG. 1 is a diagram illustrating cross-talk generated in a display panel.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

As terms used in the embodiments of the disclosure, general terms that are currently used widely were selected as far as possible, in consideration of the functions described in the disclosure. However, the terms may vary depending on the intention of those skilled in the art who work in the pertinent field or previous court decisions, or emergence of new technologies, etc. Further, in particular cases, there may be terms that were designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, terms such as "have," "may have," "include," and "may include" should be construed as denoting that there are such characteristics (e.g.: elements such as numerical values, functions, operations, and components), and the terms are not intended to exclude the existence of additional characteristics.

In addition, the expression "at least one of A or B" should be interpreted to mean any one of "A" or "B" or "A and B."

Further, the expressions "first," "second," and the like used in the disclosure may be used to describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions, unless defined differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, "a module" or "a part" performs at least one function or operation, and may be implemented as hardware or software, or as a combination of hardware and software. Further, a plurality of "modules" or "parts" may be integrated into at least one module and implemented as at least one processor, except "a module" or "a part" that needs to be implemented as specific hardware.

Also, 'a user' may mean a person who is provided with a content through a display apparatus, but is not limited thereto.

FIG. 1 is a diagram for illustrating cross-talk generated in a display panel.

A general display apparatus 100 may include a display 110, and may output various images through a plurality of pixels included in the display 110. Each of the plurality of pixels included in the display 110 may include thin film transistors (TFTs), and cross-talk (X-talk) caused by electromagnetic coupling among the plurality of TFTs arranged on the display 110 may be generated.

For example, in case the display apparatus 100 operates to display a black color 10 through one area of the display 110, and display a gray color 11 through the remaining areas excluding the one area, the TFTs included in pixels arranged in a horizontal direction based on the one area may be influenced by the TFTs in the pixels that are included in the one area and operate to display the black color 10.

Here, the pixels corresponding to the TFTs that are influenced by the cross-talk may operate in a higher luminance than the ideal luminance corresponding to an output gradation. In other words, pixels B that are influenced by the cross-talk display a brighter color 12 than a color 11 displayed by pixels A that are not influenced by the cross-talk.

Also, in case the display apparatus 100 increases a gradation corresponding to one area, cross-talk in a different appearance from the above may be generated. In case the display apparatus 100 operates to display a white color 20 through one area of the display 110, and display a gray color 11 through the remaining areas excluding the one area, pixels that are influenced by the cross-talk may operate in a lower luminance than the ideal luminance corresponding to an output gradation.

Accordingly, pixels B that are influenced by the cross-talk display a darker color 22 than a color 21 displayed by pixels A that are not influenced by the cross-talk.

The display apparatus 100 according to an embodiment of the disclosure may perform an operation of compensating cross-talk generated from one area of the display 110 such that pixels included in another area that is influenced by the cross-talk operates in ideal luminance corresponding to an output gradation.

For this, the display apparatus 100 may assume an amount of cross-talk generated from one area, and correct an output gradation value for pixels influenced by the assumed cross-talk, and can thereby reduce the cross-talk.

FIG. 1 illustrates an area influenced by cross-talk by one area includes pixels arranged in a horizontal direction based on the one area, but embodiments of the disclosure are not limited thereto. Hereinafter, one or more embodiments where histogram information is obtained based on a gradation value of pixels included in a pixel line, and the amount of cross-talk generated in the pixel line is assumed by utilizing information on a cross-talk weight for each gradation of adjacent pixels and the histogram information, and the cross-talk is compensated will be described in more detail.

Figure 2:
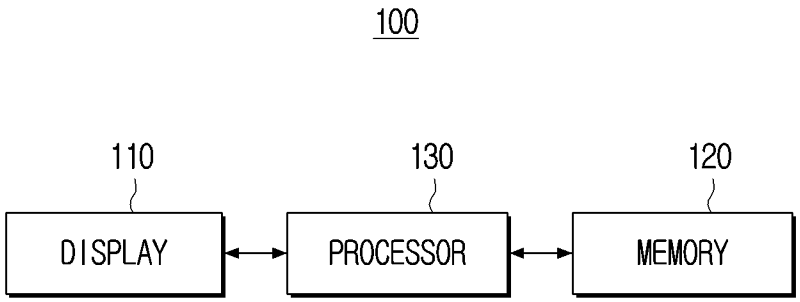
FIG. 2 is a block diagram illustrating a configuration of a display apparatus according to an embodiment of the disclosure.

FIG. 2 is a block diagram illustrating a configuration of a display apparatus according to an embodiment of the disclosure.

According to FIG. 2, the display apparatus 100 may include a display 110, a memory 120, and a processor 130.

The display 110 is a component that outputs an image provided by the display apparatus 100 to a user. The display 110 may be implemented as displays in various forms such as a liquid crystal display (LCD), an organic light emitting diodes (OLED) display, a quantum dot light emitting didoes (QLED) display, and a plasma display panel (PDP), etc. Also, the display 110 may be implemented as a display including micro LED which may include light emitting diodes (LED) of which sizes are 100 μm or smaller.

Inside the display 110, driving circuits that may be implemented in forms such as a TFT, a low temperature poly silicon (LTPS) TFT, an organic TFT (OTFT), etc., and a backlight unit, etc. may also be included. The display 110 may be implemented as a flexible display, a 3D display, etc.

The display 110 may include a plurality of pixels, and each pixel may consist of a plurality of sub-pixels. For example, each pixel may consist of three sub-pixels corresponding to a plurality of lights, e.g., rights of a red color, a green color, and a blue color (R, G, B). However, embodiments of the disclosure are not limited thereto, and depending on cases, sub-pixels in a cyan color, a magenta color, a yellow color, a black color, or other colors other than sub-pixels in a red color, a green color, and a blue color may be included. The display 110 according to an embodiment may include an LED panel, and in this case, each of the plurality of pixels may include an LED pixel.

The memory 120 may store data necessary for one or more embodiments. The memory 120 may be implemented in the form of a memory embedded in the display apparatus 100, or in the form of a memory that can be attached to or detached from the display apparatus 100 according to the use of stored data. For example, in the case of data for operating the display apparatus 100, the data may be stored in a memory embedded in the display apparatus 100, and in the case of data for an extension function of the display apparatus 100, the data may be stored in a memory that can be attached to or detached from the display apparatus 100. In the case of a memory embedded in the display apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the display apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The memory 120 may store a cross-talk weight for each gradation of adjacent pixels corresponding to a gradation value of a pixel. A cross-talk weight for each gradation may be a weight related to the degree that a pixel is influenced by cross-talk as the gradation of an adjacent pixel to the pixel changes in case the pixel has a specific gradation value, but is not limited thereto. Here, a gradation value of a pixel may mean an average value of an R gradation value, a G gradation value, and a B gradation value corresponding to the pixel, but is not limited thereto.

For example, a cross-talk weight for each gradation may include a cross-talk weight for each gradation of an adjacent pixel corresponding to a first gradation value of a pixel, and a cross-talk weight for each gradation of an adjacent pixel corresponding to a second gradation value of the pixel (a gradation value different from the first gradation value).

Here, a cross-talk weight for each gradation of an adjacent pixel corresponding to a first gradation value of a pixel may include a cross-talk weight for each gradation according to the distance between the pixel and the adjacent pixel in case the pixel has the first gradation value, and a cross-talk weight for each gradation of an adjacent pixel corresponding to a second gradation value of the pixel may include a cross-talk weight for each gradation according to the distance between the pixel and the adjacent pixel in case the pixel has the second gradation value.

For example, if the horizontal length of each pixel is referred to as d, the distance between pixels arranged in a horizontal direction may be expressed as d which is the distance between the central points of each pixel. A cross-talk weight for each gradation may include a cross-talk weight for each gradation of a pixel which is distanced from a pixel as much as n*d (n is a natural number).

Also, a cross-talk weight for each gradation may include a cross-talk weight for each of at least one gradation among R, G, B of an adjacent pixel corresponding to each R gradation value of a pixel, a cross-talk weight for each of at least one gradation among R, G, B of an adjacent pixel corresponding to each G gradation value of the pixel, and a cross-talk weight for each of at least one gradation among R, G, B of an adjacent pixel corresponding to each B gradation value of the pixel.

The processor 130 may control the overall operations of the display apparatus 100. The processor 130 may be connected with each component of the display apparatus 100, and may control the overall operations of the display apparatus 100. For example, the processor 130 may be connected with the display 110 and the memory 120, and may control the operations of the display apparatus 100.

According to an embodiment, the processor 130 may include a single processor or a plurality of processors and may include one or more of a digital signal processor (DSP), a microprocessor, a central processing unit (CPU), a micro controller unit (MCU), a micro processing unit (MPU), a neural processing unit (NPU), a controller, an application processor (AP), etc.

The processor 130 may be implemented as a system on chip (SoC) or large scale integration (LSI), or in the form of a field programmable gate array (FPGA). Also, the processor 130 may include a volatile memory such as an SRAM, etc.

The processor 130 according to an embodiment may obtain a gradation value of each of the pixels included in at least one pixel line among a plurality of pixels for one frame of an input image. Also, the processor 130 may obtain histogram information indicating the number of pixels for each gradation section based on the obtained gradation values.

The processor 130 may divide the entire gradation range into a plurality of gradation sections, and identify the number of pixels corresponding to each of the plurality of gradation sections based on the gradation value of each pixel included in a pixel line to obtain histogram information.

If it is assumed that the entire gradation range includes a natural number between 0 and 255 (8 bits), the processor 130 may divide a gradation range between 0 and 255 into a plurality of gradation sections, and obtain histogram information indicating the number of pixels corresponding to each gradation section. In the above, it is explained that the processor 130 divides a gradation range in an 8-bit format into a plurality of sections, but the entire gradation range may consist of a format other than 8 bits.

For example, the processor 130 may map gradation values corresponding to a plurality of pixels included in one pixel line to a plurality of divided gradation sections for each frame of an input image, and may obtain histogram information indicating the number of pixels corresponding to the gradation values mapped to each gradation section. As a result, the processor 130 may obtain histogram information in the same number as the number of the pixel lines of the display 110 for each frame of the input image.

Here, the processor 130 may divide a first gradation range smaller than a threshold value in the entire gradation range into a plurality of gradation sections having first length, and divide a second gradation range greater than or equal to the threshold value into a plurality of gradation sections having second length longer than the first length to obtain the histogram information. As a result, the first gradation range including a low gradation area may be divided more finely than the second gradation range including a high gradation area.

Also, the processor 130 may identify a gradation value of a target pixel which becomes a subject for cross-talk compensation, and may identify an amount of cross-talk corresponding to the target pixel based on the obtained histogram information and a cross-talk weight for each gradation of adjacent pixels corresponding to the gradation value of the target pixel.

Here, the target pixel may be a pixel of which gradation value was determined to be adjusted for compensating cross-talk generated in a pixel line. The processor 130 may determine a target pixel based on gradation information of an input image, but embodiments of the disclosure are not limited thereto.

In other words, for identifying the amount of cross-talk that influences a target pixel that is induced from adjacent pixels having various gradation values in case the target pixel operates in an identified gradation value, the processor 130 may integrate a value that multiplied the number of pixels corresponding to each gradation section in the histogram to which a plurality of pixels included in the pixel line where the target pixel belongs are mapped with a cross-talk weight related to the degree that the pixels corresponding to each gradation section influence the target pixel, and may thereby assume the amount of cross-talk by which the target pixel is influenced in the pixel line.

Also, the processor 130 may obtain a gradation correction value for correcting an output gradation of the target pixel based on the identified amount of cross-talk, and obtain a corrected gradation value of the target pixel based on the obtained gradation correction value.

For example, the processor 130 may obtain a gradation correction value to be applied to an output gradation value of the target pixel for making the target pixel controlled according to an output gradation value have the same luminance as the output luminance in case the target pixel operates in a situation wherein it is not influenced by cross-talk, and apply the gradation correction value to the output gradation value of the target pixel and obtain a corrected gradation value of the target pixel.

As described above, the operation of the processor 130 of obtaining a corrected gradation value for a target pixel may be expressed as 'an operation of compensating cross-talk.'

The processor 130 may perform cross-talk compensation based on a gradation value of each pixel included in a first pixel line for a first target pixel included in the first pixel line among the plurality of pixels included in the display 110, and perform cross-talk compensation based on a gradation value of each pixel included in a second pixel line for a second target pixel included in the second pixel line. That is, the processor 130 may independently perform cross-talk compensation for each pixel line included in the display 110.

FIG. 3 is a diagram illustrating a cross-talk weight for each gradation of adjacent pixels according to an embodiment of the disclosure.

According to FIG. 3, cross-talk weight information 300 that is stored in the memory 120 and is related to the degree that a pixel P1 adjacent to a target pixel P2 influences the target pixel P2 related to cross-talk may include a cross-talk weight corresponding to a combination of a gradation value of the adjacent pixel P1 and a gradation value of the target pixel P2. Here, the target pixel P2 and the pixel P1 adjacent to the target pixel P2 may be pixels included in the same pixel line.

The cross-talk weight information 300 may include a weight that is obtained in advance by measurement. For example, the cross-talk weight information 300 may be obtained based on data that measured 25 cross-talk weights corresponding to a combination of each of five representative values included in a gradation range 310 of the adjacent pixel P1 and a gradation range 320 of the target pixel P2.

In case each gradation range 310, 320 consists of an 8-bit format, the five representative values included in each gradation range 310, 320 may be 0, 51, 102, 153, and 204, but is not limited thereto. Also, the representative values included in each gradation range 310, 320 included in the cross-talk weight information 300 may be more or fewer than five, and in this case, the cross-talk weight information 300 may include weights having the number as much as the square ($n^2$) of the number (n) of the representative values included in each gradation range 310, 320.

Also, when the horizontal length of each pixel is referred to as d, the cross-talk weight information 300 illustrated in FIG. 3 may be information including weights corresponding to a case wherein the target pixel P2 and the adjacent pixel P1 are distanced as much as d. Other than the above, cross-talk weight information including weights corresponding to a case wherein the target pixel P2 and the adjacent pixel P1 are distanced as much as k*d (k is a natural number greater than or equal to 2) may be additionally stored in the memory 120.

In case the target pixel P2 has a gradation value of 102, according to the cross-talk weight information 300, the weight related to cross-talk influencing the target pixel P2 from the adjacent pixel P1 having a gradation value of 51 may be −100. According to an embodiment, the amount of cross-talk that may influence the target pixel P2 from the adjacent pixel P1 may be determined as a value that multiplied a cross-talk weight corresponding to a combination of the gradation value of the adjacent pixel P1 and the gradation value of the target pixel P2 with the gradation value of the adjacent pixel P1.

The processor 130 may identify the amount of cross-talk by which the target pixel P2 having the gradation value of 102 is influenced by the adjacent pixel P1 having the gradation value of 51 as −5100, and correct the gradation value of the target pixel P2 for compensating the amount of cross-talk.

FIG. 4A, FIG. 4B, and FIG. 4C are diagrams illustrating cross-talk weights related to R, G, B sub-pixels according to an embodiment of the disclosure.

The cross-talk weight information 410, 420, 430 illustrated in FIG. 4A, FIG. 4B, and FIG. 4C may be information including weights corresponding to a case wherein the target pixel P2 and the adjacent pixel P1 are distanced as much as d. Other than the above, cross-talk weight information including weights corresponding to a case wherein the target pixel P2 and the adjacent pixel P1 are distanced as much as k*d (k is a natural number greater than or equal to 2) may be additionally stored in the memory 120.

FIG. 4A illustrates the cross-talk weight information 410 including a cross-talk weight for each R gradation of the adjacent pixel P1 corresponding to each R gradation value of the target pixel P2. For example, the cross-talk weight information 410 may be obtained based on data that measured 25 cross-talk weights corresponding to a combination of each of five representative values included in an R gradation range 411 of the adjacent pixel P1 and an R gradation range 412 of the target pixel P2.

In case the target pixel P2 has an R gradation value of 102, according to the cross-talk weight information 410, the weight related to cross-talk influencing the target pixel P2 from the adjacent pixel P1 having an R gradation value of 51 may be −70.

The processor 130 may identify the amount of cross-talk by which the target pixel P2 having the R gradation value of 102 is influenced by the adjacent pixel P1 having the R gradation value of 51 as −3570, and correct the R gradation value of the target pixel P2 for compensating the amount of cross-talk.

FIG. 4B illustrates the cross-talk weight information 420 including a cross-talk weight for each G gradation of the adjacent pixel P1 corresponding to each G gradation value of the target pixel P2. For example, the cross-talk weight information 420 may be obtained based on data that measured 25 cross-talk weights corresponding to a combination of each of five representative values included in a G gradation range 421 of the adjacent pixel P1 and a G gradation range 422 of the target pixel P2.

In case the target pixel P2 has a G gradation value of 102, according to the cross-talk weight information 420, the weight related to cross-talk influencing the target pixel P2 from the adjacent pixel P1 having a G gradation value of 51 may be −50.

The processor 130 may identify the amount of cross-talk by which the target pixel P2 having the G gradation value of 102 is influenced by the adjacent pixel P1 having the G gradation value of 51 as −2550, and correct the G gradation value of the target pixel P2 for compensating the amount of cross-talk.

FIG. 4C illustrates the cross-talk weight information 430 including a cross-talk weight for each B gradation of the adjacent pixel P1 corresponding to each B gradation value of the target pixel P2. For example, the cross-talk weight information 430 may be obtained based on data that measured 25 cross-talk weights corresponding to a combination of each of five representative values included in a B gradation range 431 of the adjacent pixel P1 and a B gradation range 432 of the target pixel P2.

In case the target pixel P2 has a B gradation value of 102, according to the cross-talk weight information 430, the weight related to cross-talk influencing the target pixel P2 from the adjacent pixel P1 having a B gradation value of 51 may be −60.

The processor 130 may identify the amount of cross-talk by which the target pixel P2 having the B gradation value of 102 is influenced by the adjacent pixel P1 having the B gradation value of 51 as −3060, and correct the B gradation value of the target pixel P2 for compensating the amount of cross-talk.

In FIG. 4A, 4B, and FIG. 4C, only cross-talk weights corresponding to a combination of gradation values of the same color of the adjacent pixel P1 and the target pixel P2 were explained, but cross-talk weight information including cross-talk weights corresponding to a combination of gradation values of different colors of the adjacent pixel P1 and the target pixel P2 may be stored in the memory 120.

FIG. 5 is a diagram illustrating cross-talk weights regarding a plurality of gradation sections having different lengths from one another according to an embodiment of the disclosure.

According to FIG. 5, the cross-talk weight information 500 may be obtained based on data that measured 49 cross-talk weights corresponding to a combination of each of seven representative values included in a gradation range 510 of the adjacent pixel P1 and a gradation range 520 of the target pixel P2.

In case each gradation range 510, 520 has an 8-bit format, the seven representative values included in each gradation range 510, 520 may be 0, 17, 34, 51, 102, 153, and 204, but is not limited thereto.

In particular, a weight regarding cross-talk by which the target pixel P2 is influenced by the adjacent pixel P1 when the target pixel P2 has a gradation value belonging to a low gradation range 540 (0, 17, 34, etc.) may change according to change of a gradation value of the adjacent pixel P1 more than a weight regarding cross-talk by which the target pixel P2 is influenced by the adjacent pixel P1 when the target pixel P2 has a gradation value belonging to a high gradation range (51, 102, 153, 204, etc.). Thus, an interval between representative values belonging to the low gradation range 540 in the gradation range of the target pixel P2 and an interval between representative values belonging to the low gradation range 530 in the gradation range of the adjacent pixel P1 may be relatively shorter than an interval between representative values included in a high gradation range in the gradation range of each pixel.

Figure 6:
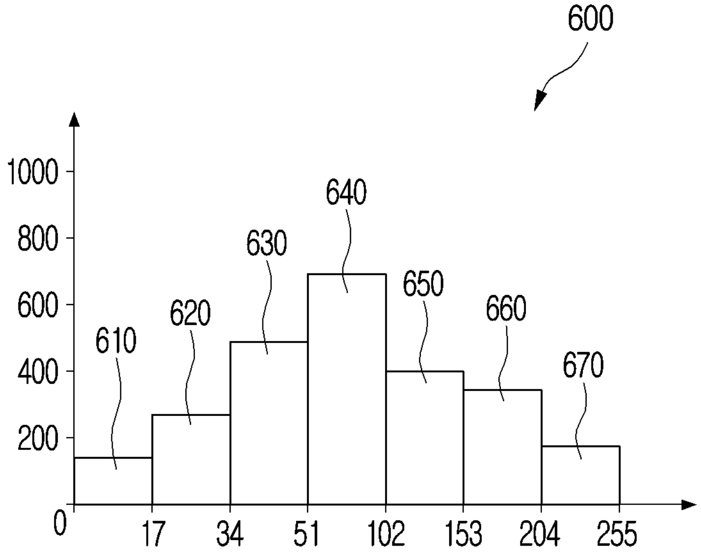
FIG. 6 is a diagram illustrating histogram information according to an embodiment of the disclosure.

FIG. 6 is a diagram illustrating histogram information according to an embodiment of the disclosure.

The processor 130 may obtain a gradation value of each of a plurality of pixels included in one pixel line of the display 110, and obtain histogram information 600 based on this.

According to an embodiment, in case the display 110 has a resolution of 2560*1440 (QHD), the processor 130 may identify gradation values of 2560 pixels included in any one pixel line among 1440 pixel lines, and may obtain the histogram information 600 indicating the number of pixels corresponding to each of seven gradation sections 610 to 670 included in the entire gradation range in the 8-bit format.

According to the histogram information based on an embodiment, 140 pixels may be included in the first gradation section 610, 280 pixels may be included in the second gradation section 620, 500 pixels may be included in the third gradation section 630, 700 pixels may be included in the fourth gradation section 640, 400 pixels may be included in the fifth gradation section 650, 360 pixels may be included in the sixth gradation section 660, and 180 pixels may be included in the seventh gradation section 670.

The processor 130 may identify a cross-talk weight for each gradation of adjacent pixels corresponding to a low limit value of a gradation section including the gradation value of the target pixel P2 in the cross-talk weight information stored in the memory 120. For example, in case the gradation value of the target pixel P2 included in a pixel line is 25, the processor 130 may identify a cross-talk weight for each gradation of adjacent pixels corresponding to 17 which is a low limit value of the gradation section 620 to which the gradation value 25 belongs.

Referring to FIG. 5, the representative values included in the gradation range 520 of the target pixel P2 and the gradation range 510 of the adjacent pixel P1 may be values corresponding to low limit values of the plurality of gradation sections 610 to 670 included in the histogram information 600. The processor 130 may identify, as cross-talk information related to the target pixel P2, a weight 541 regarding cross-talk by which the target pixel P2 is influenced according to the gradation of the adjacent pixel P1 in case the target pixel P2 has a gradation value of 17.

The processor 130 may calculate the amount of cross-talk by which the target pixel P2 is influenced by the adjacent pixel P1 in the pixel line based on the degree of each gradation section included in the histogram information 600 and the identified weight 541. For example, the processor 130 may identify the amount of cross-talk by which the target pixel P2 is influenced by the adjacent pixel P1 by multiplying a lower limit value of each gradation section where the gradation value of the adjacent pixel P1 belongs among the identified weights 541, a weight corresponding to the low limit value, and the degree of each gradation section where the gradation value of the adjacent pixel P1 belongs, and integrating the value.

Specifically, the processor 130 may identify that {0*(−1000)*140}+{17*0*(280-1)}+{34*300*500}+{51*200*700}+{102*150*400}+{153*200*360}+{204*300*180}=40,392,000 is the total amount of cross-talk by which the target pixel P2 is influenced.

Figure 7:
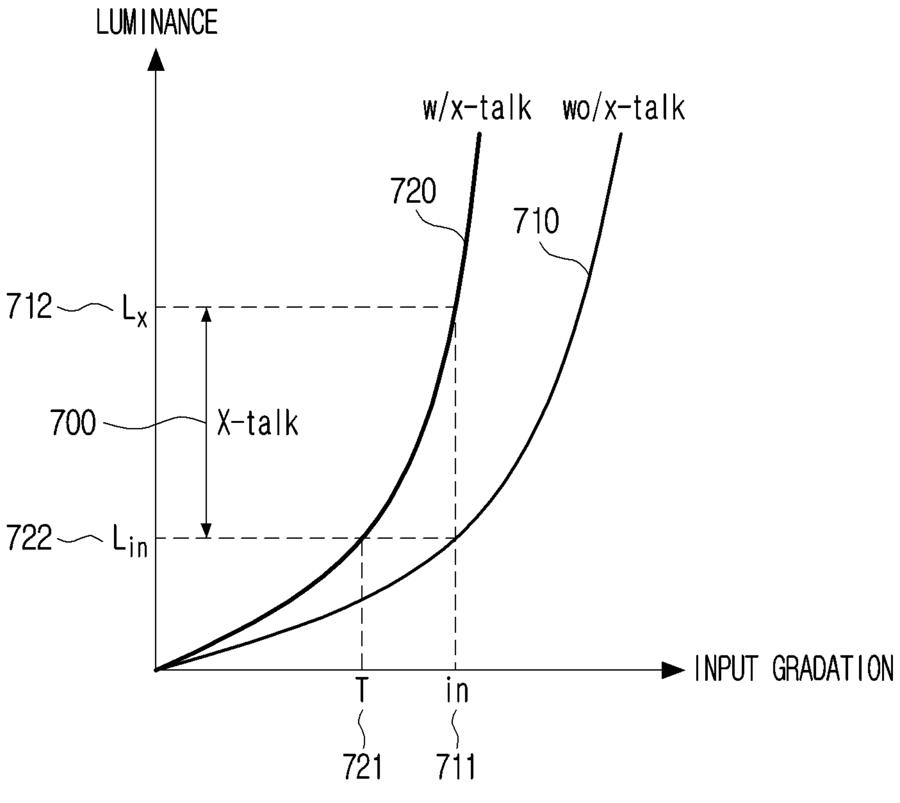
FIG. 7 is a diagram illustrating an operation of obtaining a gradation correction value based on a cross-talk amount according to an embodiment of the disclosure.

FIG. 7 is a diagram illustrating an operation of obtaining a gradation correction value based on a cross-talk amount according to an embodiment of the disclosure.

The processor 130 may identify a relation 710 between a gradation value of a target pixel and may output luminance in case there is no influence of cross-talk 700. Also, the processor 130 may identify output luminance 721 corresponding to an output gradation 711 of the target pixel as target luminance, and identify luminance 722 at which the target pixel actually operates based on the target luminance 721 and the amount of the cross-talk 700 influencing the target pixel.

The processor 130 may also identify a relation 720 between a gradation value of a target pixel influenced by the cross-talk 700 and output luminance based on the luminance 722 at which the target pixel influenced by the cross-talk 700 in the pixel line actually operates. In this process, the processor 130 may identify the relation 720 between the gradation value of the target pixel influenced by the cross-talk 700 and the output luminance based on the histogram information corresponding to the pixel line including the target pixel and the cross-talk weight information stored in the memory 120, but embodiments of the disclosure are not limited thereto.

The processor 130 may obtain a gradation value 712 that the target pixel influenced by the cross-talk 700 should have for outputting the target luminance 721 as the target gradation value based on the target luminance 721 and the relation 720 between the gradation value of the target pixel influenced by the cross-talk 700 and the output luminance.

According to the above description, the processor 130 may not obtain a gradation correction value of the target pixel, and obtain a corrected gradation value of the target pixel based on the obtained gradation correction value for compensating the cross-talk 700, but may directly obtain the gradation value 712 that the target pixel should have for outputting the target luminance 721 as the target gradation value.

The processor 130 may compensate the influence of the cross-talk 700 that was generated in the pixel line by controlling the target pixel to have the target gradation value 712, and may thereby output an image without distortion.

Figure 8:
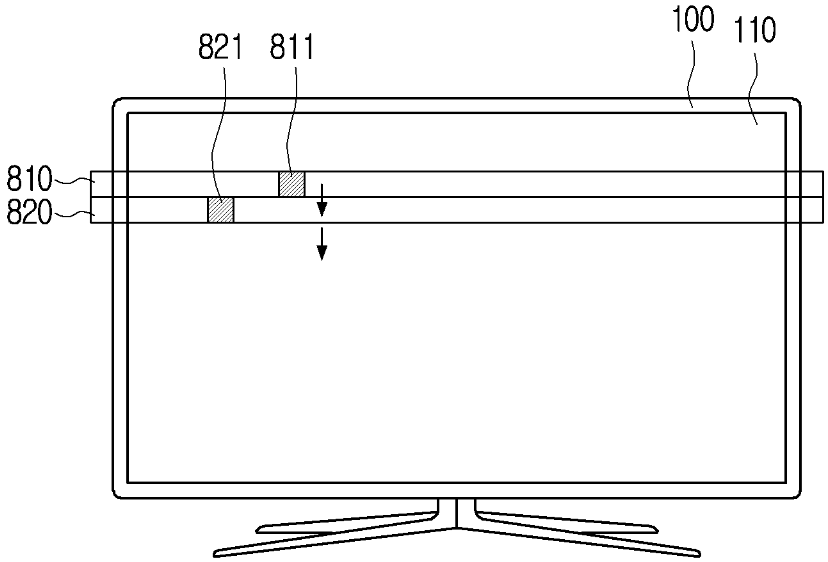
FIG. 8 is a diagram illustrating an operation of compensating cross-talk for each pixel line according to an embodiment of the disclosure.

FIG. 8 is a diagram illustrating an operation of compensating cross-talk for each pixel line according to an embodiment of the disclosure.

The display apparatus 100 may perform cross-talk compensation for each of the plurality of pixel lines included in the display 110. For example, the processor 130 may perform cross-talk compensation based on a gradation value of each of the pixels included in the first pixel line 810 and the cross-talk weights stored in the memory 120 for the first target pixel 811 included in the first pixel line 810 among the plurality of pixels, and perform cross-talk compensation based on a gradation value of each of the pixels included in the second pixel line 820 and the cross-talk weights stored in the memory 120 for the second target pixel 821 included in the second pixel line 820.

According to an embodiment, in case the display 110 has a resolution of 2560*1440 (QHD), the processor 130 may perform 1440 times of cross-talk compensation for 1440 pixel lines to the maximum, and in case there are pixel lines not including target pixels of which gradation values need to be adjusted among the plurality of pixel lines, the number of times of performing cross-talk compensation may become fewer than 1440 times.

In FIG. 8, it was explained that cross-talk compensation for the first pixel line 810 is performed prior to cross-talk compensation for the second pixel line 820 that is located relatively lower than the first pixel line 810, but the processor 130 may perform cross-talk compensation in the order from the pixel line located in the lower part of the display 110 to the pixel line located in the upper part.

Figure 9:
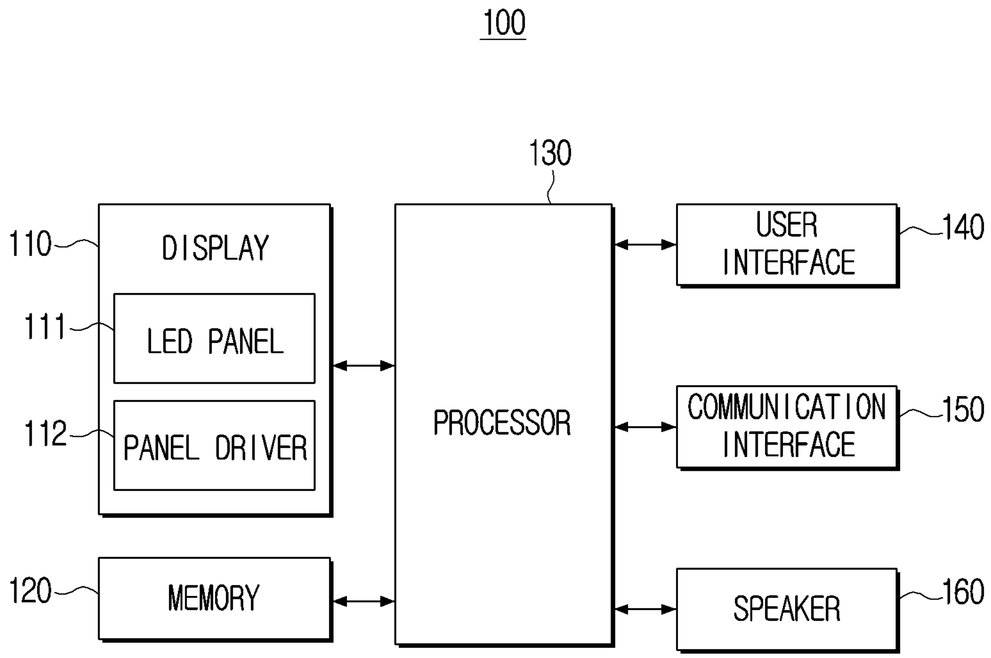
FIG. 9 is a block diagram illustrating a configuration of a display apparatus according to an embodiment of the disclosure.

FIG. 9 is a block diagram illustrating a configuration of a display apparatus according to an embodiment of the disclosure.

According to FIG. 9, the display apparatus 100 may include an LED panel 111, a panel driver 112, a memory 120, a processor 130, a user interface 140, a communication interface 150, and a speaker 160. Among the components illustrated in FIG. 9, regarding components overlapping with the components illustrated in FIG. 2, detailed explanation will be omitted.

The LED panel 111 may include a plurality of pixels, and each pixel may consist of a plurality of sub-pixels. Also, the LED panel 111 may be constituted as a form that was assembled by connecting a plurality of LED modules (LED modules including at least one LED element). Here, each of the plurality of LED modules may include a plurality of pixels arranged in a matrix form, e.g., self-luminous pixels.

According to an embodiment, the LED panel 111 may also be implemented as a plurality of LED cabinets. Also, the plurality of LED modules and/or the plurality of LED cabinets may include a plurality of LED pixels, and according to an embodiment, an LED pixel may be implemented as an RGB LED, and the RGB LED may include an R LED, a G LED, and a B LED together.

The panel driver 112 may drive the LED panel 111 according to control by the processor 130. For example, the panel driver 112 may drive each LED pixel by applying a driving voltage or making a driving current flow for driving each LED pixel constituting the LED panel 111 according to a control by the processor 130.

In case the LED panel 111 includes a plurality of LED modules, the panel driver 112 may include a plurality of panel driving modules connected to each of the plurality of LED modules. The plurality of panel driving modules may drive the plurality of LED modules by providing a driving current to the plurality of LED modules based on each control signal input from the processor 130.

Here, the panel driver 112 may include a power supply for supplying power. The power supply is hardware that converts an alternating current into a direct current so that it can be used in the LED panel 111 stably, and supplies power to fit each system. The power supply may largely consist of an input electromagnetic interference (EMI) filter part, an AC-DC rectifier, a DC-DC switching converter, an output filter, and an outputter. The power supply may be implemented as, for example, a switched mode power supply (SMPS). The SMPS is a DC stabilizing power device that stabilizes an output by controlling an on-off time ratio of a semiconductor switching element, and it may have high efficiency and may be miniaturized and lightened, and thus it may be used in driving an LED panel.

The user interface 140 is a component that is involved in performing of an interaction by the display apparatus 100 with a user. For example, the user interface 140 may include at least one of a touch sensor, a motion sensor, a button, a jog dial, a switch, or a microphone, but is not limited thereto.

If a user instruction related to a cross-talk compensating operation is input through the user interface 140, the processor 130 may perform cross-talk compensation based on the user instruction.

The communication interface 150 may input and output various types of data. For example, the communication interface 150 may transmit and receive various types of data with an external apparatus (e.g., a source apparatus), an external storage medium (e.g., a USB memory), and an external server (e.g., a web hard) through communication methods such as Wi-Fi based on AP (Wi-Fi, a wireless LAN network), Bluetooth, Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), optical, coaxial, etc.

For example, the processor 130 may receive information related to an image to be output through the display 110 through the communication interface 150. Also, the processor 130 may control the communication interface 150 to transmit information related to a cross-talk compensating operation to a user terminal.

The speaker 160 is a device that converts an electroacoustic signal corresponding to audio provided by the display apparatus 100, which was generated from the processor 130, into a sound wave. The speaker 160 may include a permanent magnet, a coil, and a vibration plate, and output sounds by vibrating the vibration plate by an electromagnetic interaction that occurs between the permanent magnet and the coil. For example, the processor 130 may control the speaker 160 to output audio related to an image provided through the display 110.

Figure 10:
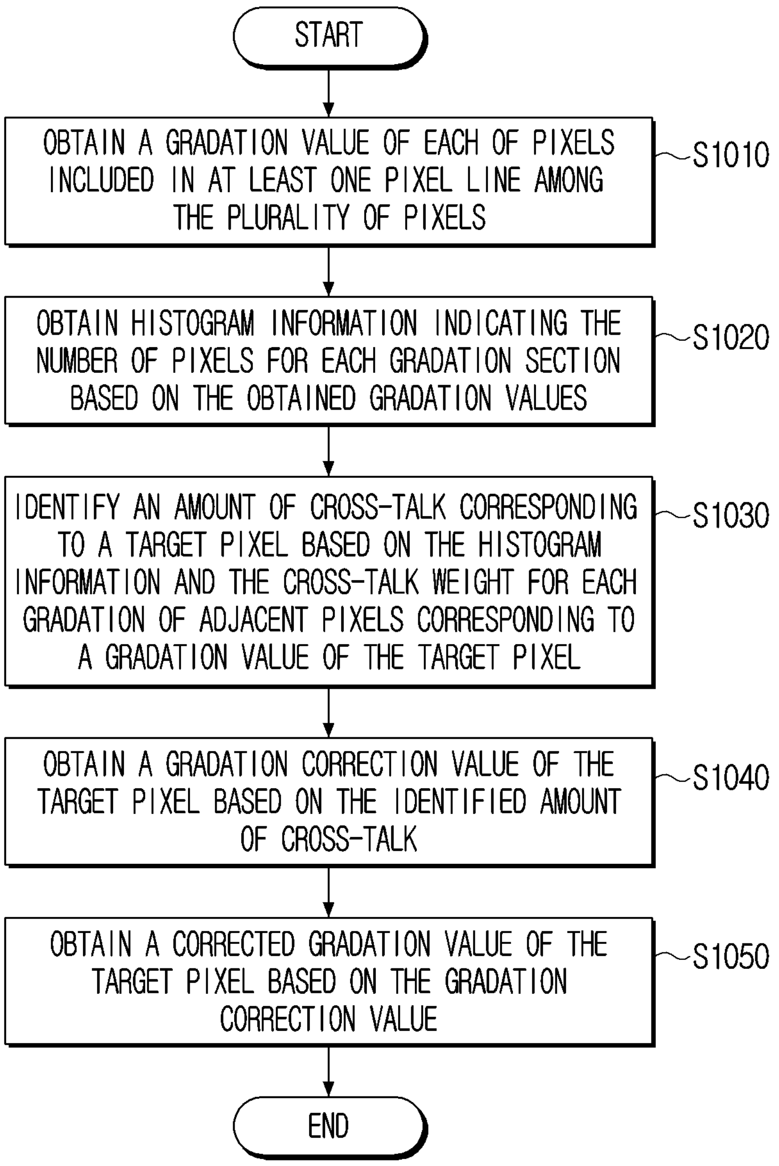
FIG. 10 is a flow chart illustrating a controlling method according to an embodiment of the disclosure.

FIG. 10 is a flow chart illustrating a controlling method according to an embodiment of the disclosure.

In a controlling method according to an embodiment of the disclosure, a gradation value of each of pixels included in at least one pixel line among the plurality of pixels may be obtained in operation S1010.

Then, histogram information indicating the number of pixels for each gradation section may be obtained based on the obtained gradation values in operation S1020.

Then, an amount of cross-talk corresponding to a target pixel may be identified based on the histogram information and the cross-talk weight for each gradation of adjacent pixels corresponding to a gradation value of the target pixel in operation S1030.

Then, a gradation correction value of the target pixel may be obtained based on the identified amount of cross-talk in operation S1040.

Lastly, a corrected gradation value of the target pixel may be obtained based on the obtained gradation correction value.

Here, the cross-talk weight may include a cross-talk weight for each gradation of an adjacent pixel corresponding to a first gradation value of a pixel and a cross-talk weight for each gradation of an adjacent pixel corresponding to a second gradation value of the pixel.

Here, the cross-talk weight for each gradation of the adjacent pixel corresponding to the first gradation value of the pixel may include, based on the pixel having the first gradation value, a cross-talk weight for each gradation according to the distance between the pixel and the adjacent pixel. Also, the cross-talk weight for each gradation of the adjacent pixel corresponding to the second gradation value of the pixel may include, based on the pixel having the second gradation value, a cross-talk weight for each gradation according to the distance between the pixel and the adjacent pixel.

Also, in the operation S1020 of obtaining the histogram information, the entire gradation range may be divided into a plurality of gradation sections, and the number of pixels corresponding to each of the plurality of gradation sections may be identified based on the obtained gradation value for each pixel to obtain the histogram information.

Here, in the operation S1020 of obtaining the histogram information, a first gradation range smaller than a threshold value in the entire gradation range may be divided into a plurality of gradation sections having first length, and a second gradation range greater than or equal to the threshold value may be divided into a plurality of gradation sections having second length longer than the first length to obtain the histogram information.

Also, the cross-talk weight may include a cross-talk weight for each of at least one gradation among R, G, B of an adjacent pixel corresponding to each R gradation value of the pixel, a cross-talk weight for each of at least one gradation among R, G, B of an adjacent pixel corresponding to each G gradation value of the pixel, and a cross-talk weight for each of at least one gradation among R, G, B of an adjacent pixel corresponding to each B gradation value of the pixel.

In addition, the controlling method according to an embodiment may further include the steps of performing cross-talk compensation based on a gradation value of each pixel included in a first pixel line for a first target pixel included in the first pixel line among the plurality of pixels, and performing cross-talk compensation based on a gradation value of each pixel included in a second pixel line for a second target pixel included in the second pixel line among the plurality of pixels.

Further, each of the plurality of pixels may include an LED pixel.

According to one or more embodiments of the disclosure, histogram information may be obtained based on gradation values of pixels included in a pixel line, and an amount of cross-talk generated in the pixel line may be assumed by utilizing cross-talk weight information for each gradation of adjacent pixels and the histogram information, and the cross-talk may be compensated.

Also, according to the one or more embodiments of the disclosure, a display apparatus may reduce cross-talk generated in a display panel, and thus the satisfaction of a user who is provided with an image through the display panel may be improved.

Methods according to the one or more embodiments of the disclosure may be implemented in forms of applications that may be installed on conventional display apparatuses.

Also, the methods according to the one or more embodiments of the disclosure may be implemented with a software upgrade, or hardware upgrade of conventional display apparatuses.

In addition, the one or more embodiments may be performed through an embedded server provided on a display apparatus, or through at least one external server.

The one or more embodiments may be implemented in a recording medium that can be read by a computer or an apparatus similar to a computer, by using software, hardware, or a combination thereof. In some cases, the one or more embodiments may be implemented as the processor 130 itself. According to implementation by software, the one or more embodiments such as procedures and functions may be implemented as separate software modules. Each of the software modules may perform one or more functions and operations described in this specification.

Computer instructions for performing processing operations of the display apparatus 100 according to the one or more embodiments of the disclosure may be stored in a non-transitory computer readable-medium. Computer instructions stored in such a non-transitory computer-readable medium may make the processing operations of the display apparatus 100 according to the one or more embodiments performed by a specific apparatus, when they are executed by the processor of the specific apparatus.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:

a display comprising a plurality of pixels;

a memory storing a cross-talk weight for each gradation of adjacent pixels corresponding to a gradation value of a target pixel included in a pixel line among the plurality of pixels; and at least one processor configured to:

obtain a gradation value of each pixel included in at least one line of pixels among the plurality of pixels, obtain histogram information indicating a number of pixels corresponding to each gradation section based on the obtained gradation value of each pixel in the at least one line of pixels, identify an amount of cross-talk to which the target pixel is influenced by adjacent pixels based on the number of pixels corresponding to each gradation section according to the histogram information and the cross-talk weight for each gradation of adjacent pixels corresponding to the gradation value of the target pixel, obtain a gradation correction value of the target pixel based on the identified amount of cross-talk, and obtain a corrected gradation value of the target pixel based on the obtained gradation correction value, and wherein the at least one processor is further configured to identify the amount of crosstalk by integrating values obtained by multiplying the number of pixels corresponding to each gradation section in the histogram information, to which the target pixel included in the pixel line among the plurality of pixels is mapped, with a cross-talk weight corresponding to each gradation section.

2. The display apparatus of claim 1, wherein the cross-talk weight for each gradation of adjacent pixels corresponding to the gradation value of the target pixel comprises:

a cross-talk weight for each gradation of an adjacent pixel corresponding to a first gradation value of the target pixel and a cross-talk weight for each gradation of an adjacent pixel corresponding to a second gradation value of the target pixel.

3. The display apparatus of claim 2, wherein the cross-talk weight for each gradation of the adjacent pixel corresponding to the first gradation value of the target pixel comprises:

based on the target pixel having the first gradation value, a cross-talk weight for each gradation of the adjacent pixel is according to a distance between the target pixel and the adjacent pixel, and wherein the cross-talk weight for each gradation of the adjacent pixel corresponding to the second gradation value of the target pixel comprises:

based on the target pixel having the second gradation value, a cross-talk weight for each gradation of the adjacent pixel is according to the distance between the target pixel and the adjacent pixel.

4. The display apparatus of claim 1, wherein the at least one processor is further configured to:

divide a gradation range into a plurality of gradation sections, and identify the number of pixels corresponding to each of the plurality of gradation sections based on the obtained gradation value for each pixel to obtain the histogram information.

5. The display apparatus of claim 4, wherein the at least one processor is further configured to:

divide a first gradation range that is smaller than a threshold value in the gradation range into a plurality of gradation sections having a first length, and divide a second gradation range that is greater than or equal to the threshold value in the gradation range into a plurality of gradation sections having a second length that is longer than the first length to obtain the histogram information.

6. The display apparatus of claim 1, wherein the cross-talk weight for each gradation of adjacent pixels corresponding to the gradation value of the target pixel comprises:

a cross-talk weight for each gradation of at least one of an R sub-pixel, a G sub-pixel, or a B sub-pixel of an adjacent pixel corresponding to each gradation value of an R sub-pixel of the target pixel;

a cross-talk weight for each gradation of at least one of the R sub-pixel, the G sub-pixel, or the B sub-pixel of the adjacent pixel corresponding to each gradation value of a G sub-pixel of the target pixel; and a cross-talk weight for each gradation of at least one of the R sub-pixel, the G sub-pixel, or the B sub-pixel of the adjacent pixel corresponding to each gradation value of a B sub-pixel of the target pixel.

7. The display apparatus of claim 1, wherein the at least one processor is further configured to:

obtain a corrected gradation value of a first target pixel included in a first line of pixels among the plurality of pixels, based on a gradation value of each pixel included in the first line, and obtain a corrected gradation value of a second target pixel included in a second line of pixels among the plurality of pixels, based on a gradation value of each pixel included in the second line.

8. The display apparatus of claim 1, wherein each of the plurality of pixels comprises at least one light emitting diode (LED).

9. A method for controlling a display apparatus including a plurality of pixels, the method comprising:

obtaining a gradation value of each pixel included in at least one line of pixels among the plurality of pixels;

obtaining histogram information indicating a number of pixels corresponding to each gradation section based on the obtained gradation value of each pixel in the at least one line of pixels;

identifying an amount of cross-talk to which a target pixel is influenced by adjacent pixels based on the number of pixels corresponding to each gradation section according to the histogram information and a cross-talk weight for each gradation of adjacent pixels corresponding to a gradation value of the target pixel, wherein the target pixel is included in a pixel line among the plurality of pixels;

obtaining a gradation correction value of the target pixel based on the identified amount of cross-talk; and obtaining a corrected gradation value of the target pixel based on the obtained gradation correction value, and wherein the identifying comprises identifying the amount of cross-talk by integrating values obtained by multiplying the number of pixels corresponding to each gradation section in the histogram information, to which the target pixel included in the pixel line among the plurality of pixels is mapped, with a cross-talk weight corresponding to each gradation section.

10. The method of claim 9, wherein the cross-talk weight for each gradation of adjacent pixels corresponding to the gradation value of the target pixel comprises:

a cross-talk weight for each gradation of an adjacent pixel corresponding to a first gradation value of the target pixel and a cross-talk weight for each gradation of an adjacent pixel corresponding to a second gradation value of the target pixel.

11. The method of claim 10, wherein the cross-talk weight for each gradation of the adjacent pixel corresponding to the first gradation value of the target pixel comprises:

based on the target pixel having the first gradation value, a cross-talk weight for each gradation of the adjacent pixel is according to a distance between the target pixel and the adjacent pixel, and wherein the cross-talk weight for each gradation of the adjacent pixel corresponding to the second gradation value of the target pixel comprises:

based on the target pixel having the second gradation value, a cross-talk weight for each gradation of the adjacent pixel is according to the distance between the target pixel and the adjacent pixel.

12. The method of claim 9, wherein the obtaining the histogram information comprises:

dividing a gradation range into a plurality of gradation sections, and identifying the number of pixels corresponding to each of the plurality of gradation sections based on the obtained gradation value for each pixel.

13. The method of claim 12, wherein the dividing the gradation range into a plurality of sections comprises:

dividing a first gradation range that is smaller than a threshold value in the gradation range into a plurality of gradation sections having a first length, and dividing a second gradation range that is greater than or equal to the threshold value in the gradation range into a plurality of gradation sections having a second length that is longer than the first length.

14. The method of claim 9, wherein the cross-talk weight for each gradation of adjacent pixels corresponding to the gradation value of the target pixel comprises:

a cross-talk weight for each gradation of at least one of an R sub-pixel, a G sub-pixel, or a B sub-pixel of an adjacent pixel corresponding to each gradation value of an R sub-pixel of the target pixel;

a cross-talk weight for each gradation of at least one of the R sub-pixel, the G sub-pixel, or the B sub-pixel of an adjacent pixel corresponding to each gradation value of a G sub-pixel of the target pixel; and a cross-talk weight for each gradation of at least one of the R sub-pixel, the G sub-pixel, or the B sub-pixel of an adjacent pixel corresponding to each gradation value of a B sub-pixel of the target pixel.

15. The method of claim 9, further comprising:

obtaining a corrected gradation value of a first target pixel included in a first line of pixels among the plurality of pixels, based on a gradation value of each pixel included in the first line; and obtaining a corrected gradation value of a second target pixel included in a second line of pixels among the plurality of pixels, based on a gradation value of each pixel included in the second line.

16. A non-transitory computer-readable medium configured to store computer instructions for a display apparatus including a plurality of pixels to perform an operation when executed by a processor of the display apparatus, the operation comprising:

obtaining a gradation value of each pixel included in at least one line of pixels among the plurality of pixels;

obtaining histogram information indicating a number of pixels corresponding to each gradation section based on the obtained gradation value of each pixel in the at least one line of pixels;

identifying an amount of cross-talk to which a target pixel is influenced by adjacent pixels based on the number of pixels corresponding to each gradation section according to the histogram information and a cross-talk weight for each gradation of adjacent pixels corresponding to a gradation value of the target pixel, wherein the target pixel is included in a pixel line among the plurality of pixels;

obtaining a gradation correction value of the target pixel based on the identified amount of cross-talk; and obtaining a corrected gradation value of the target pixel based on the obtained gradation correction value, and wherein the identifying comprises identifying the amount of cross-talk by integrating values obtained by multiplying the number of pixels corresponding to each gradation section in the histogram information, to which the target pixel included in the pixel line among the plurality of pixels is mapped, with a cross-talk weight corresponding to each gradation section.

17. The non-transitory computer-readable medium of claim 16, wherein the cross-talk weight for each gradation of adjacent pixels corresponding to the gradation value of the target pixel comprises:

a cross-talk weight for each gradation of an adjacent pixel corresponding to a first gradation value of the target pixel and a cross-talk weight for each gradation of an adjacent pixel corresponding to a second gradation value of the target pixel.

18. The non-transitory computer-readable medium of claim 17, wherein the cross-talk weight for each gradation of the adjacent pixel corresponding to the first gradation value of the target pixel comprises:

based on the target pixel having the first gradation value, a cross-talk weight for each gradation of the adjacent pixel is according to a distance between the target pixel and the adjacent pixel, and wherein the cross-talk weight for each gradation of the adjacent pixel corresponding to the second gradation value of the target pixel comprises:

based on the target pixel having the second gradation value, a cross-talk weight for each gradation of the adjacent pixel is according to the distance between the target pixel and the adjacent pixel.

19. The non-transitory computer-readable medium of claim 16, wherein the obtaining the histogram information comprises:

dividing a gradation range into a plurality of gradation sections, and identifying the number of pixels corresponding to each of the plurality of gradation sections based on the obtained gradation value for each pixel.

20. The non-transitory computer-readable medium of claim 19, wherein the dividing the gradation range into a plurality of sections comprises:

dividing a first gradation range that is smaller than a threshold value in the gradation range into a plurality of gradation sections having a first length, and dividing a second gradation range that is greater than or equal to the threshold value in the gradation range into a plurality of gradation sections having a second length that is longer than the first length.

* * * * *